(12) United States Patent
Yamaura

(10) Patent No.: US 10,497,961 B2
(45) Date of Patent: Dec. 3, 2019

(54) INTEGRATED METAL-AND-PLASTIC MOLDED ARTICLE AND METHOD FOR MANUFACTURING INTEGRATED METAL-AND-PLASTIC MOLDED ARTICLE

(71) Applicant: TOYOTA BOSHOKU KABUSHIKI KAISHA, Aichi-ken (JP)

(72) Inventor: Kunihiro Yamaura, Tokai (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 83 days.

(21) Appl. No.: 15/399,359

(22) Filed: Jan. 5, 2017

(65) Prior Publication Data

US 2017/0200968 A1 Jul. 13, 2017

(30) Foreign Application Priority Data

Jan. 12, 2016 (JP) .................. 2016-003726

(51) Int. Cl.
*H01M 8/2484* (2016.01)
*B32B 3/24* (2006.01)
(Continued)

(52) U.S. Cl.
CPC .......... *H01M 8/2404* (2016.02); *B22D 17/00* (2013.01); *B22D 25/02* (2013.01); *B29C 45/14311* (2013.01); *B29C 45/14819* (2013.01); *B32B 3/266* (2013.01); *B32B 3/30* (2013.01); *B32B 15/08* (2013.01); *H01M 8/04201* (2013.01); *H01M 8/2484* (2016.02); *B29C 2045/14327* (2013.01); *B29C 2045/14975* (2013.01);
(Continued)

(58) Field of Classification Search
None
See application file for complete search history.

(56) References Cited

U.S. PATENT DOCUMENTS 2,722,043 A * 11/1955 Nenzell ................. E04B 1/6812
49/479.1
3,451,853 A * 6/1969 Spahrbier .............. B22D 19/00
429/469
(Continued)

FOREIGN PATENT DOCUMENTS

DE 102012000265 A1 * 7/2012 ............ H01M 8/247
EP 0048559 A2 * 3/1982 ............... C25B 9/18
(Continued)

OTHER PUBLICATIONS

Machine Translation of JP-03013309-A, Jan. 1991 (Year: 1991).*
(Continued)

*Primary Examiner* — Jeffrey A Vonch
(74) *Attorney, Agent, or Firm* — Greenblum & Bernstein, P.L.C.

(57) ABSTRACT

An integrated metal-and-plastic molded article includes a metal plate having a first surface and a second surface in the thickness direction, a first plastic portion on the first surface, a second plastic portion on the second surface, a through-hole that extends through the metal plate in the thickness direction and opens in the first surface and the second surface, and an intermediate plastic portion arranged to fill the through-hole and to be continuous with the first plastic portion and the second plastic portion.

6 Claims, 5 Drawing Sheets

(51) Int. Cl.
  *B32B 3/30* (2006.01)
  *B32B 15/08* (2006.01)
  *B29C 45/14* (2006.01)
  *B22D 17/00* (2006.01)
  *B22D 25/02* (2006.01)
  *H01M 8/2404* (2016.01)
  *B32B 3/26* (2006.01)
  *H01M 8/04082* (2016.01)
  *B32B 15/20* (2006.01)
  *B29L 31/34* (2006.01)

(52) U.S. Cl.
  CPC ....... *B29L 2031/3468* (2013.01); *B32B 15/20* (2013.01); *B32B 2457/18* (2013.01); *Y02P 70/56* (2015.11)

(56) References Cited

U.S. PATENT DOCUMENTS

| | | | | |
|---|---|---|---|---|
| 3,490,776 A * | 1/1970 | Avery | ............... | F16J 15/127 277/649 |
| 4,118,553 A * | 10/1978 | Buckethal | ............... | B22D 19/00 429/234 |
| 4,237,205 A * | 12/1980 | Matter | ............... | H01M 4/72 429/234 |
| 4,371,433 A * | 2/1983 | Balko | ............... | C25B 9/206 204/230.2 |
| 5,075,066 A * | 12/1991 | Terada | ............... | A44B 19/262 264/247 |
| 5,405,089 A * | 4/1995 | Heimann | ............... | B05B 1/185 239/533.14 |
| 5,672,405 A | 9/1997 | Plank, Jr. et al. | | |
| 5,730,363 A * | 3/1998 | Kress | ............... | B05B 15/528 239/123 |
| 6,153,326 A * | 11/2000 | Matsukawa | ....... | B29C 45/14778 428/215 |
| 6,291,094 B1 * | 9/2001 | Yoshimura | ............... | H01M 8/0204 427/115 |
| 6,503,435 B1 * | 1/2003 | Mockenhaupt | ..... | B29C 37/0082 264/261 |
| 6,749,959 B2 * | 6/2004 | Nakata | ............... | H01M 8/0204 429/517 |
| 2003/0143451 A1 * | 7/2003 | Andou | ............... | H01M 8/0221 429/457 |
| 2003/0180598 A1 * | 9/2003 | Fischer | ............... | H01M 8/0221 429/457 |
| 2004/0101736 A1 * | 5/2004 | Tawfik | ............... | H01M 8/0258 429/458 |
| 2005/0118484 A1 | 6/2005 | Kawachi et al. | | |
| 2005/0142414 A1 * | 6/2005 | Kimura | ............... | H01M 8/0247 429/508 |
| 2006/0003208 A1 * | 1/2006 | Haycock | ............... | H01M 8/242 429/483 |
| 2006/0024559 A1 * | 2/2006 | Benthem | ............... | H01M 8/2483 429/457 |
| 2006/0066061 A1 * | 3/2006 | Hosokawa | ............... | F16J 15/024 277/628 |
| 2006/0090330 A1 * | 5/2006 | Kauranen | ............... | H01M 8/0213 29/623.4 |
| 2006/0093882 A1 * | 5/2006 | Muller | ............... | H01M 8/0271 29/623.2 |
| 2006/0105222 A1 * | 5/2006 | Abd Elhamid | ..... | H01M 8/0204 429/210 |
| 2006/0141319 A1 * | 6/2006 | Hu | ............... | H01M 8/0223 429/434 |
| 2006/0204823 A1 * | 9/2006 | Mazza | ............... | H01M 8/2415 429/457 |
| 2006/0204824 A1 * | 9/2006 | Mazza | ............... | H01M 8/0206 429/434 |
| 2007/0007141 A1 * | 1/2007 | Maeda | ............... | H01M 8/2465 205/57 |
| 2008/0280183 A1 * | 11/2008 | Eun | ............... | H01M 8/0247 429/454 |
| 2009/0233139 A1 * | 9/2009 | Suzuki | ............... | H01M 8/04067 429/434 |
| 2010/0209798 A1 * | 8/2010 | Nunokawa | ............... | H01M 8/0206 429/455 |
| 2011/0033781 A1 * | 2/2011 | Chin | ............... | H01M 8/2483 429/510 |
| 2011/0104583 A1 * | 5/2011 | Urakawa | ............... | B29C 45/14311 429/469 |
| 2013/0017470 A1 * | 1/2013 | Hotta | ............... | H01M 8/0267 429/458 |
| 2013/0059227 A1 * | 3/2013 | Suh | ............... | H01M 8/248 429/482 |
| 2013/0065157 A1 * | 3/2013 | Suh | ............... | H01M 8/0221 429/510 |
| 2013/0295481 A1 * | 11/2013 | Kim | ............... | H01M 8/04007 429/434 |
| 2013/0295491 A1 * | 11/2013 | Takeyama | ............... | H01M 8/04089 429/513 |
| 2014/0065472 A1 * | 3/2014 | Naritomi | ............... | B29C 45/14311 429/175 |
| 2015/0064598 A1 * | 3/2015 | Martinchek | ............... | H01M 2/1077 429/469 |
| 2015/0086886 A1 * | 3/2015 | Blank | ............... | H01M 8/241 429/413 |
| 2015/0173227 A1 * | 6/2015 | Ott | ............... | G01P 1/026 361/728 |
| 2015/0188179 A1 * | 7/2015 | Suh | ............... | H01M 8/248 264/263 |
| 2015/0303493 A1 * | 10/2015 | Heo | ............... | H01M 8/248 429/509 |
| 2016/0133952 A1 * | 5/2016 | Takeyama | ............... | H01M 8/247 429/457 |
| 2016/0141662 A1 * | 5/2016 | Takeyama | ............... | H01M 8/04201 429/444 |

FOREIGN PATENT DOCUMENTS

| | | | | | |
|---|---|---|---|---|---|
| EP | 0774637 | A2 | * | 5/1997 | ............ B21D 53/04 |
| GB | 2008022 | A | | 5/1979 | ......... B29C 37/0085 |
| JP | 57210294 | A | * | 12/1982 | ............... F28F 3/10 |
| JP | 03013309 | A | * | 1/1991 | |
| JP | 2000164238 | A | * | 6/2000 | |
| JP | 2000173629 | A | * | 6/2000 | |
| JP | 2002025574 | A | * | 1/2002 | |
| JP | 2004-39436 | | | 2/2004 | |
| JP | 2004245341 | A | * | 9/2004 | |
| JP | 2004311084 | A | * | 11/2004 | |
| JP | 2005129402 | A | * | 5/2005 | |
| JP | 2005268080 | A | * | 9/2005 | |
| JP | 2006048984 | A | * | 2/2006 | |
| JP | 2009170169 | A | * | 7/2009 | |
| JP | 2010205463 | A | * | 9/2010 | |
| JP | 2012-183705 | | | 9/2012 | |
| JP | 2013086303 | A | * | 5/2013 | |
| JP | 2013-141814 | | | 7/2013 | |
| JP | 2015-008086 | | | 1/2015 | |
| JP | 2015-109534 | | | 6/2015 | |
| JP | 2015201264 | A | * | 11/2015 | |
| KR | 20060005296 | A | * | 1/2006 | |
| KR | 100757131 | B1 | * | 9/2007 | |
| KR | 20090028941 | A | * | 3/2009 | |
| KR | 20110059982 | A | * | 6/2011 | |
| KR | 20110059990 | A | * | 6/2011 | |
| KR | 101305118 | B1 | * | 9/2013 | |

OTHER PUBLICATIONS

Machine Translation of JP-2013086303-A, May 2013 (Year: 2013).*
Machine Translation of KR-100757131-B1, Sep. 2007 (Year: 2007).*
Machine Translation of KR-101305118-B1, Sep. 2013 (Year: 2013).*
Machine Translation of JP 2000164238 A, Jun. 2000 (Year: 2000).*
Machine Translation of KR 20060005296 A, Jan. 2006 (Year: 2006).*

(56) References Cited

OTHER PUBLICATIONS

Office Action issued in Japan Counterpart Patent Appl. No. 2016-003726, dated 06/18/219, along with an English translation thereof.

* cited by examiner

INTEGRATED METAL-AND-PLASTIC MOLDED ARTICLE AND METHOD FOR MANUFACTURING INTEGRATED METAL-AND-PLASTIC MOLDED ARTICLE

BACKGROUND OF THE INVENTION

The present invention relates to an integrated metal-and-plastic molded article and a method for manufacturing the integrated metal-and-plastic molded article.

As an integrated metal-and-plastic molded article, stack manifolds attached to ends of fuel cell stacks are known (see Japanese Laid-Open Patent Publication No. 2015-8086). A stack manifold is adapted to selectively supply fluid such as fuel gas, oxidation gas, and coolant to and discharge fluid from the fuel cell stack. The fuel cell stack generates electric power using fuel gas and oxidation gas that are selectively supplied and discharged via the stack manifold and is cooled down by the coolant that is selectively supplied and discharged via the stack manifold.

The stack manifold includes a metal plate (an end plate). The metal plate is attached to an end of the fuel cell stack at a first surface in the thickness direction of the metal plate. Recesses are formed in the first surface when the metal plate is attached to the end of the fuel cell stack, the recesses configure channels adapted to selectively supply fluid such as fuel gas, oxidation gas, and coolant to and discharge fluid from the fuel cell stack. Also, a plastic portion, which insulates the metal plate and the fuel cell stack from each other, is provided on the first surface (including the inner walls of the recesses).

To manufacture the stack manifold, insert molding is performed as will be described. That is, after setting a cast metal plate in a mold, molten plastic is injected into and solidified in the mold, thus forming the plastic portion on the first surface. Since the injection pressure of the plastic acts on the first surface, the metal plate must have a great thickness to tolerate the injection pressure. Specifically, a method for casting a metal plate having a great thickness includes a gravity casting method using gravity to pour molten metal into a casting mold.

As a casting method having higher productivity than the gravity casting method, there is a high-pressure die casting method that applies high pressure to molten metal when the metal is poured into a casting mold. To ensure mass production, there is a demand for manufacturing such metal plates using the high-pressure die casting method. However, to manufacture a metal plate having a great thickness using the high-pressure die casting method, molten metal is poured into a casting mold before the gas in the casting mold is completely discharged. This forms voids (hollow portions) in the obtained metal plate.

To restrain such void formation, the thickness of the metal plate that should be manufactured may be decreased to promote the gas discharge at the time the molten metal is poured into the casting mold. However, this causes a problem. When molten plastic is injected into a mold in which the metal plate is set for insert molding, the injection pressure of the plastic acts on the metal plate in the thickness direction. This may deform the metal plate and thus lower the quality of the product.

SUMMARY OF THE INVENTION

Accordingly, it is an objective of the present invention to provide an integrated metal-and-plastic molded article and a method for manufacturing the integrated metal-and-plastic molded article capable of improving the productivity and ensuring high quality of the metal plate.

To achieve the foregoing objective and in accordance with one aspect of the present invention, an integrated metal-and-plastic molded article is provided that includes a metal plate having a first surface and a second surface in a thickness direction, a first plastic portion provided on the first surface, a second plastic portion provided on the second surface, a through-hole that extends through the metal plate in the thickness direction and opens in the first surface and the second surface, and an intermediate plastic portion that is arranged to fill the through-hole and be continuous with the first plastic portion and the second plastic portion.

To achieve the foregoing objective and in accordance with another aspect of the present invention, a method for manufacturing an integrated metal-and-plastic molded article is provided. After a metal plate that has been formed using a high-pressure die casting method and has a first surface and a second surface in a thickness direction is set in a mold, a molten plastic is injected into and solidified in the mold to form a plastic portion on the first surface. The method includes: setting, in a mold, a metal plate that has been formed using the high-pressure die casting method and has a through-hole extending through the metal plate in a thickness direction; and when a molten plastic is injected into the mold, causing the plastic to flow from a side corresponding to a first surface in the thickness direction of the metal plate to a side corresponding to a second surface in the thickness direction via the through-hole.

DETAILED DESCRIPTION OF THE PREFERRED EMBODIMENTS

An embodiment of a stack manifold, which is an integrated metal-and-plastic molded article, and a method for manufacturing the stack manifold will hereafter be described with reference to FIGS. 1 to 8.

Figure 1:
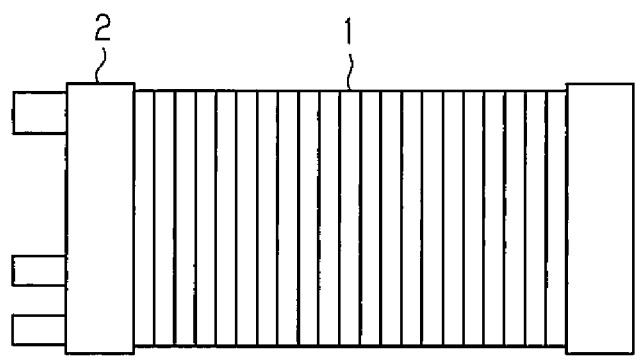
FIG. 1 is a schematic diagram showing a manner in which a stack manifold is attached to a fuel cell stack.

As illustrated in FIG. 1, a stack manifold 2, which is an integrated metal-and-plastic molded article, is attached to an end of a fuel cell stack 1. The stack manifold 2 is adapted to selectively supply fluid such as hydrogen (fuel gas), air (oxidation gas), and coolant water (coolant) to and discharge fluid from the fuel cell stack 1. The fuel cell stack 1 generates electric power using hydrogen and air that are selectively supplied and discharged via the stack manifold 2 and is cooled down by the coolant water that is selectively supplied and discharged via the stack manifold 2.

Figure 2:
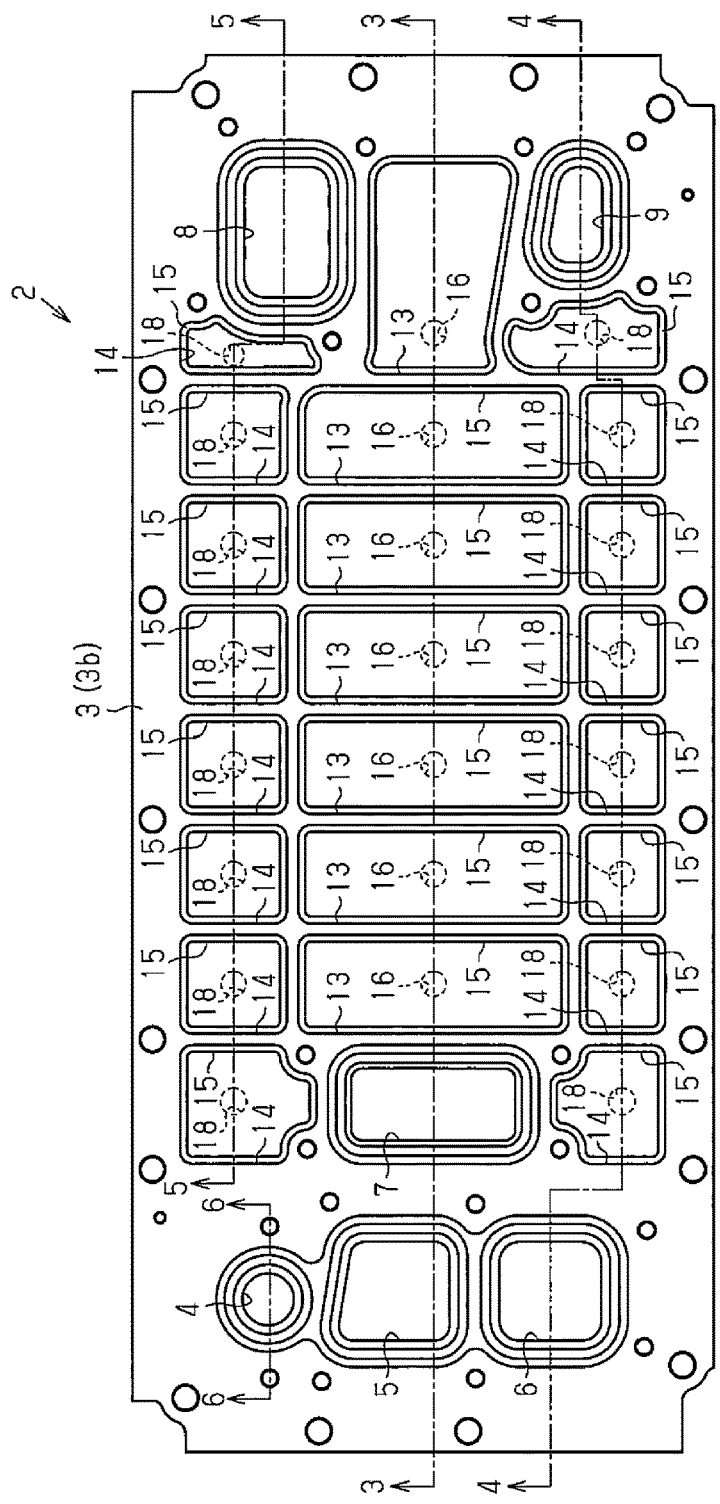
FIG. 2 is a plan view showing the stack manifold.
Figure 3:
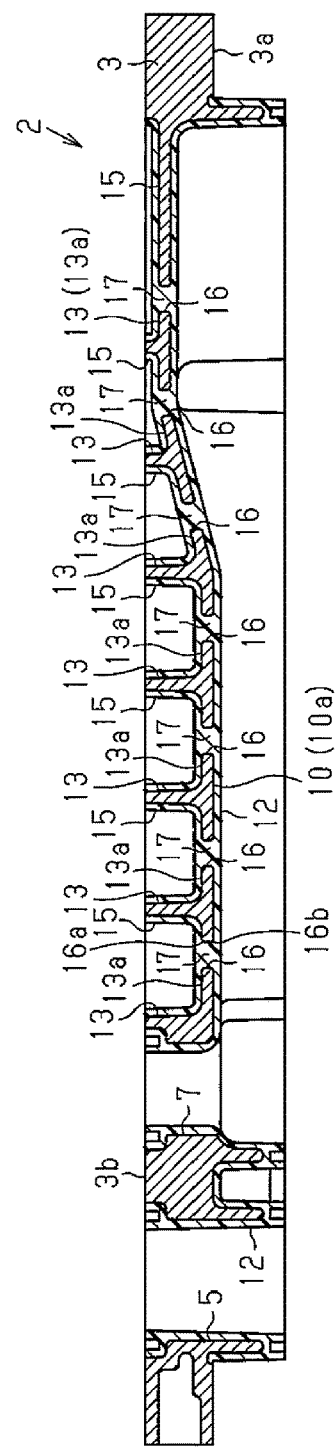
FIG. 3 is a cross-sectional view taken along line 3-3 of FIG. 2.
Figure 4:
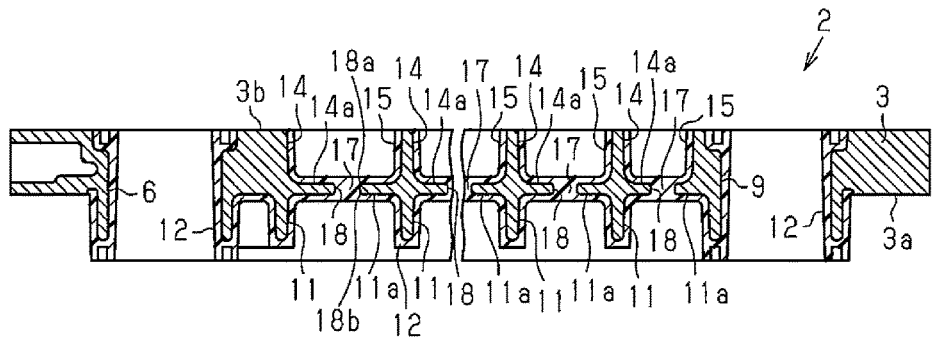
FIG. 4 is a cross-sectional view taken along line 4-4 of FIG. 2.
Figure 5:
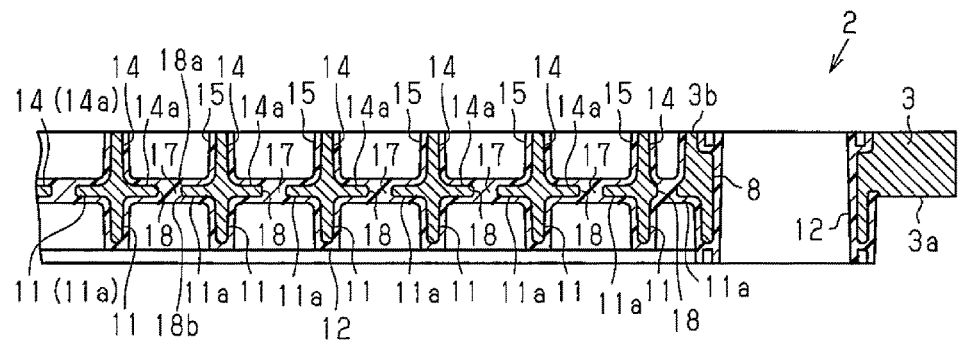
FIG. 5 is a cross-sectional view taken along line 5-5 of FIG. 2.
Figure 6:
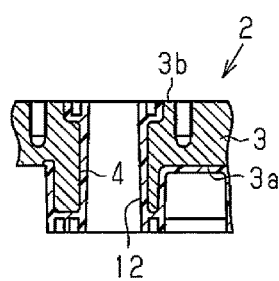
FIG. 6 is a cross-sectional view taken along line 6-6 of FIG. 2.

FIGS. 2 to 6 show the shape of the stack manifold 2 in detail. FIG. 2 illustrates a state of the stack manifold 2 of FIG. 1 as viewed from the opposite side to the fuel cell stack 1 (the left side as viewed in FIG. 1). FIG. 3 is a cross-sectional view taken along line 3-3 of FIG. 2. FIG. 4 is a cross-sectional view taken along line 4-4 of FIG. 2. FIG. 5 is a cross-sectional view taken along line 5-5 of FIG. 2. FIG. 6 is a cross-sectional view taken along line 6-6 of FIG. 2.

With reference to FIG. 2, the stack manifold 2 includes a rectangular end plate (a rectangular metal plate) 3, which is made of metal such as aluminum alloy. The end plate 3 has supply passages 4, 5, 6 and a discharge passage 7 in a first end, which is one of the opposite ends of the end plate 3 in the longitudinal direction (the left-right direction as viewed in FIG. 2). The supply passages 4, 5, 6 and the discharge passage 7 extend through the end plate 3 in the thickness direction. The end plate 3 also has discharge passages 8, 9 in a second end, which is the other one of the opposite ends. The discharge passages 8, 9 extend through the end plate 3 in the thickness direction. The supply passages 4, 5, 6 are adapted to supply hydrogen, coolant water, and air, respectively, to the fuel cell stack 1, which is illustrated in FIG. 1. The discharge passages 7, 8, 9 are adapted to discharge coolant water, air, and hydrogen, respectively, from the fuel cell stack 1.

In the stack manifold 2, the end plate 3 is attached to the fuel cell stack 1. More specifically, the end plate 3 is attached to the end of the fuel cell stack 1 at a first surface 3a, which is one of the opposite sides in the thickness direction of the end plate 3. The first surface 3a of the end plate 3 corresponds to the lower surface as viewed in FIGS. 3 to 6. Referring to FIG. 3, a first recess 10, which is elongated in the longitudinal direction of the end plate 3, is provided in the first surface 3a of the end plate 3. First recesses 11 are also provided in the first surface 3a, as illustrated in FIGS. 4 and 5.

When the stack manifold 2 (the end plate 3) is attached to the fuel cell stack 1, the first recess 10 configures a channel adapted to selectively supply fluid to and discharge fluid from the fuel cell stack 1. In the present embodiment, the first recess 10 is connected to the discharge passage 7 and configures a channel adapted to discharge coolant water from the fuel cell stack 1. The first recesses 11 each serve as a thin section adapted to decrease the weight of the end plate 3.

A first plastic portion 12, which insulates the end plate 3 and the fuel cell stack 1 from each other, is provided on the first surface 3a. The first plastic portion 12 has a predetermined thickness and is formed like a coating covering the entire first surface 3a including the inner walls of the first recesses 10, 11. The first plastic portion 12 is arranged to cover the inner walls of the supply passages 4, 5, 6 and the discharge passages 7, 8, 9.

The other one of the opposite surfaces of the end plate 3 in the thickness direction, which is the surface opposite to the first surface 3a, configures a second surface 3b. As illustrated in FIG. 3, second recesses 13 are formed in the second surface 3b in the direction in which the first recess 10 extends (the left-right direction as viewed in the drawing). A coating-like second plastic portion 15, which has a predetermined thickness, is provided on the inner wall of each of the second recesses 13.

Through-holes 16, which extend through the end plate 3 in the thickness direction and open in the first surface 3a and the second surface 3b, are formed between the first recess 10 and the corresponding second recesses 13. More specifically, each of the through-holes 16 opens in a bottom surface 10a of the first recess 10 and a bottom surface 13a of the corresponding one of the second recesses 13. The opening of each through-hole 16 in the bottom surface 13a of the corresponding second recess 13 is located substantially at the center of the bottom surface 13a. The length of each through-hole 16 in the axial direction (the vertical direction as viewed in FIG. 3) is set to, for example, 2 to 4 mm. Opposite ends 16a, 16b of the inner wall of the through-hole 16 in the axial direction of the through-hole 16 are each curved in an arcuate shape in the axial direction. An intermediate plastic portion 17 is provided in each through-hole 16 to fill the through-hole 16 and to be continuous with the first plastic portion 12 and the corresponding second plastic portion 15.

With reference to FIGS. 4 and 5, a plurality of second recesses 14, each of which corresponds to one of the first recesses 11, are formed in the second surface 3b. A coating-like second plastic portion 15, which has a predetermined thickness, is formed on the inner wall of each of the second recesses 14.

Through-holes 18, which extend through the end plate 3 in the thickness direction and open in the first surface 3a and the second surface 3b, are formed between the first recesses 11 and the corresponding second recesses 14. More specifically, each of the through-holes 18 opens in a bottom surface 11a of the corresponding one of the first recesses 11 and a bottom surface 14a of the associated one of the second recesses 14. The opening of each through-hole 18 in the bottom surface 14a of the corresponding second recess 14 is located substantially at the center of the bottom surface 14a. The length of each through-hole 18 in the axial direction (the vertical direction as viewed in FIGS. 4 and 5) is set to, for example, 2 to 4 mm. Also, opposite ends 18a, 18b of the inner wall of the through-hole 18 in the axial direction of the through-hole 18 (the vertical direction as viewed in FIGS. 4 and 5) are each curved in an arcuate shape in the axial direction. The intermediate plastic portion 17 is also provided in each through-hole 18 to fill the through-hole 18 and be continuous with the first plastic portion 12 and the corresponding second plastic portion 15.

A method for manufacturing the stack manifold 2 will hereafter be described.

The end plate 3 of the stack manifold 2 is cast using the high-pressure die casting method, which has higher productivity than the gravity casting method. To manufacture the stack manifold 2 using the end plate 3, insert molding is performed as will be described. That is, the end plate 3, which has been cast using the high-pressure die casting method and has the through-holes 16, 18, is set in a mold for insert molding. Then, molten plastic is injected into and solidified in the mold.

Figure 7:
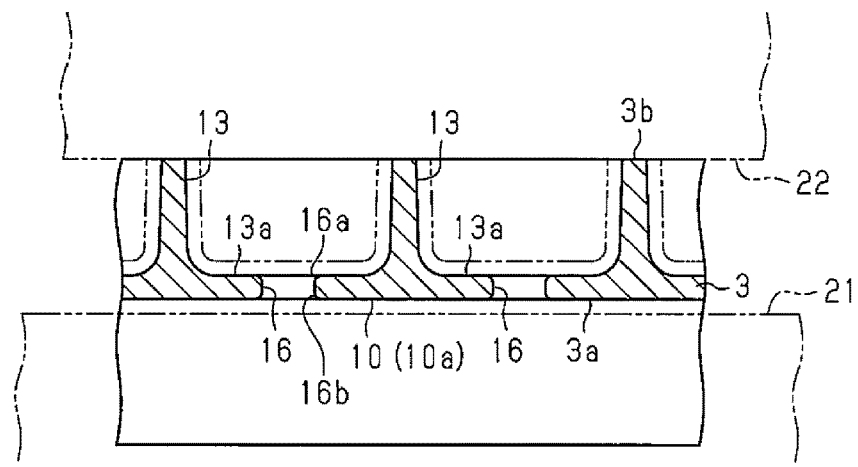
FIG. 7 is a cross-sectional view showing a state in which an end plate is set in a mold for insert molding.
Figure 8:
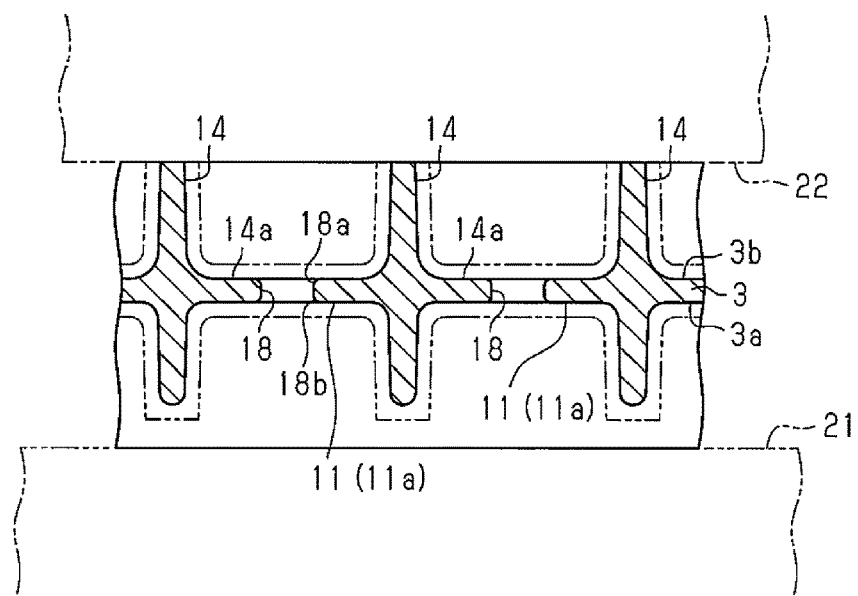
FIG. 8 is another cross-sectional view showing a state in which an end plate is set in a mold for insert molding.

FIGS. 7 and 8 each show a state in which the end plate 3 is set in molds 21, 22 for insert molding.

When plastic is injected into the molds 21, 22, the plastic flows into the first recess 10 in the first surface 3a of the end plate 3 shown in FIG. 7. The injection pressure of the plastic thus acts on the inner wall (the bottom surface 10a) of the first recess 10. However, the injected plastic flows from inside the first recess 10 of the first surface 3a of the end plate 3 into the second recesses 13 of the second surface 3b via the through-holes 16. Such flow of the plastic from the side corresponding to the first surface 3a to the side corresponding to the second surface 3b via the through-holes 16 restrains increase of the injection pressure of the plastic acting on the first surface 3a of the end plate 3. As the plastic solidifies, the first plastic portion 12, the intermediate plastic portions 17, and the second plastic portions 15 are formed on the first surface 3a, the inner walls of the through-holes 16, and the second surface 3b, respectively (FIG. 3). The first plastic portion 12 covers the inner wall of the first recess 10 including the bottom surface 10a. Each of the second plastic portions 15 covers the inner wall of the corresponding one of the second recesses 13 including the bottom surface 13a.

After being injected into the molds 21, 22, the plastic also flows into the first recesses 11 in the first surface 3a of the end plate 3, which are illustrated in FIG. 8. The injection pressure of the plastic thus acts on the inner wall (the bottom surface 11a) of each first recess 11. However, the injected plastic flows from inside the first recesses 11 of the first surface 3a of the end plate 3 into the second recesses 14 in the second surface 3b via the through-holes 18. Such flow of the plastic from the side corresponding to the first surface 3a to the side corresponding to the second surface 3b via the through-holes 18 restrains increase of the injection pressure of the plastic acting on the first surface 3a of the end plate 3. As the plastic solidifies, the first plastic portion 12, the intermediate plastic portions 17, and the second plastic portions 15 are formed on the first surface 3a, the inner walls of the through-holes 18, and the second surface 3b, respectively (FIGS. 4 and 5). The first plastic portion 12 also covers the inner wall of each first recess 11 including the bottom surface 11a. Each second plastic portion 15 covers the inner wall of the corresponding second recess 14 including the bottom surface 14a.

As has been described, in insert molding, the plastic injected into the molds 21, 22 flows from the side corresponding to the first surface 3a to the side corresponding to the second surface 3b via the through-holes 16 (FIG. 7) and the through-holes 18 (FIG. 8). This restrains increase of the injection pressure of the plastic acting on the end plate 3, thus enabling the end plate 3 to tolerate the injection pressure without increasing the thickness of the end plate 3. That is, the numbers, shapes, and locations of the through-holes 16, 18 in the end plate 3 are determined to decrease the injection pressure acting on the end plate 3 to such an extent that the end plate 3 is maintained without deforming when the injection pressure acts on the end plate 3, which has a small thickness. Further, by using the end plate 3 having the small thickness, formation of voids (hollow portions) in the end plate 3 is restrained even if the end plate 3 is manufactured using the high-pressure die casting method, which is a highly productive casting method.

The present embodiment, which has been described in detail, has the advantages described below.

(1) Despite the fact that the end plate 3 is formed to have a small thickness using the high-pressure die casting method, which is highly productive, the injection pressure of plastic acting on the end plate 3 in insert molding is decreased. This restrains deformation of the end plate 3 caused by action of the injection pressure, thus restraining lowering of the quality of the end plate 3 caused by the deformation of the end plate 3. As a result, the productivity of the stack manifold 2 is improved and high quality of the end plate 3 is ensured.

(2) When the stack manifold 2 (the end plate 3) is attached to the fuel cell stack 1, the first recess 10 configures a channel adapted to selectively supply fluid to and discharge fluid from the fuel cell stack 1. Since the first plastic portion 12 is provided to cover the inner wall of the first recess 10 including the bottom surface 10a, the fluid flowing in the aforementioned channel and the end plate 3 are insulated from each other by the first plastic portion 12.

(3) In the end plate 3, each through-hole 16 opens at the center of the bottom surface 13a of the corresponding second recess 13 and each through-hole 18 opens at the center of the bottom surface 14a of the corresponding second recess 14. This facilitates, in insert molding, uniform spreading of molten plastic in each of the second recesses 13, 14 at the time the plastic flows from the side corresponding to the first surface 3a of the end plate 3 to the side corresponding to the second surface 3b via the through-holes 16, 18, or, more specifically, the plastic flows from inside the first recesses 10, 11 into the second recesses 13, 14 via the through-holes 16, 18.

(4) The opposite ends 16a, 16b of the inner wall of each through-hole 16 in the axial direction of the through-hole 16 are each curved in an arcuate shape in the axial direction. The opposite ends 18a, 18b of the inner wall of each through-hole 18 in the axial direction of the through-hole 18 are each curved in an arcuate shape in the axial direction. This restrains breakage of the plastic portions 12, 15, 17 even if the ends 16a, 16b, 18a, 18b of the through-holes 16, 18 strike the first plastic portion 12, the second plastic portions 15, and the intermediate plastic portions 17 after the stack manifold 2 is manufactured.

The illustrated embodiment may be modified to the forms described below.

The opposite ends 16a, 16b of the inner wall of each through-hole 16 in the axial direction of the through-hole 16 do not necessarily have to be curved in an arcuate shape in the aforementioned axial direction. The opposite ends 18a, 18b of the inner wall of each through-hole 18 in the axial direction of the through-hole 18 do not necessarily have to be curved in an arcuate shape in the aforementioned axial direction.

The opening position of the through-hole 16 in the bottom surface 13a of each second recess 13 may be changed as needed.

The opening position of the through-hole 18 in the bottom surface 14a of each second recess 14 may be changed as needed.

The second recesses 13, 14 do not necessarily have to be provided. In this case, the second plastic portions 15 are arranged in the portions of the second surface 3b that are continuous at least with the through-holes 16, 18.

When the stack manifold 2 is attached to the end of the fuel cell stack 1, the first recess 10 does not necessarily have to configure the channel for flow of the fluid selectively supplied to and discharged from the fuel cell stack 1.

The present invention may be used for any integrated metal-and-plastic molded article other than the stack manifold 2. In this case, the first recesses 10, 11 do not necessarily have to be provided in the first surface 3a or the second recesses 13, 14 do not necessarily have to be provided in the second surface 3b.

The invention claimed is:

1. An integrated metal-and-plastic molded article comprising:
    a metal plate having a first surface and a second surface in a thickness direction, wherein at least one metal plate recess is formed in at least one of the first surface and the second surface of the metal plate, the metal plate defining an end plate adapted to be attached to an end of a fuel call stack at the first surface:
    a first plastic portion provided on the first surface and configured to insulate the fuel cell stack and the metal plate from each other:
    a second plastic portion provided on the second surface;
    at least one connecting through-hole that extends through the metal plate in the thickness direction and opens in a bottom surface of the at least one metal plate recess that is formed in the at least one of the first surface and the second surface of the metal plate; and an intermediate plastic portion that is arranged to completely fill the at least one connecting through-hole and be continuous with the first plastic portion and the second plastic portion, wherein the at least one metal plate recess being coated by a material of at least one of the first plastic portion and the second plastic portion so as to only partially fill a volume of the at least one metal plate recess, the at least one metal plate recess includes a first recess that is provided in the first surface, the first recess is configured to provide a channel adapted to selectively supply fluid to and discharge fluid from the fuel cell stack through a fluid passing hole provided in the metal plate, the at least one connecting through-hole opens in a bottom surface of the first recess, and the first plastic portion is provided also on an inner wall of the first recess and is configured to insulate the fluid flowing in the channel and the fluid passing hole from the metal plate.

2. The integrated metal-and-plastic molded article according to claim 1, wherein the at least one metal plate recess includes a second recess provided in the second surface, the at least one connecting through-hole opens in a bottom surface of the second recess so as to communicatively connect the first recess and the second recess, and the second plastic portion is provided on an inner wall of the second recess.

3. The integrated metal-and-plastic molded article according to claim 2, wherein the at least one connecting through-hole opens at a center of the bottom surface of the second recess.

4. The integrated metal-and-plastic molded article according to claim 1, wherein opposite ends of an inner wall of the at least one connecting through-hole in an axial direction of the through-hole are each curved into an arcuate shape in the axial direction.

5. The integrated metal-and-plastic molded article according to claim 2, wherein the second recess is among a plurality of second recesses provided in the second surface of the metal plate.

6. A method for manufacturing the integrated metal-and-plastic molded article of claim 1, the method comprising:

forming the metal plate having the first surface and the second surface using a high-pressure die casting;

setting the metal plate in a mold;

injecting a molten plastic into the mold, causing the plastic to flow from the first surface to the second surface in the thickness direction via the at least one connecting through-hole; and solidifying the molten plastic to form the first plastic portion on the first surface and the second plastic portion on the second surface.

* * * * *